(12) United States Patent
Poncet

(10) Patent No.: US 10,457,476 B2
(45) Date of Patent: Oct. 29, 2019

(54) VIBRATORY FLOOR WITH CONTROLLED ATMOSPHERE, FOR COHESIVE PRODUCTS

(71) Applicant: Vibrafloor SAS, Givry (FR)

(72) Inventor: Jean-Claude Poncet, Sennecey-le-Grand (FR)

(73) Assignee: VIBRAFLOOR SAS, Givry (FR)

( * ) Notice: Subject to any disclaimer, the term of this patent is extended or adjusted under 35 U.S.C. 154(b) by 470 days.

(21) Appl. No.: 15/040,166

(22) Filed: Feb. 10, 2016

(65) Prior Publication Data

US 2017/0225914 A1 Aug. 10, 2017

(51) Int. Cl.
| | |
|---|---|
| *B65D 83/06* | (2006.01) |
| *B65D 88/26* | (2006.01) |
| *B65D 88/54* | (2006.01) |
| *B65G 27/16* | (2006.01) |
| *B65G 27/34* | (2006.01) |
| *B65G 65/44* | (2006.01) |
| *B65G 69/08* | (2006.01) |

(52) U.S. Cl.
CPC .............. *B65D 83/06* (2013.01); *B65D 88/26* (2013.01); *B65D 88/54* (2013.01); *B65G 27/16* (2013.01); *B65G 27/34* (2013.01); *B65G 65/44* (2013.01); *B65G 69/08* (2013.01)

(58) Field of Classification Search
CPC ........ B65D 27/16; B65D 27/34; B65D 69/08; B65D 83/06; B65D 88/26; B65D 88/54; B65G 27/16; B65G 27/34; B65G 69/08; B65G 65/44
See application file for complete search history.

(56) References Cited

U.S. PATENT DOCUMENTS

| | | | | | |
|---|---|---|---|---|---|
| 2,400,425 | A | * | 5/1946 | Liber | E04B 9/20 267/177 |
| 3,112,823 | A | * | 12/1963 | Musschoot | B65G 27/16 198/751 |
| 3,459,457 | A | * | 8/1969 | Weaver | B65G 69/0491 406/160 |
| 3,583,246 | A | * | 6/1971 | Stahle | B06B 1/14 198/766 |
| 3,583,553 | A | * | 6/1971 | Spurlin | B06B 1/161 198/763 |
| 4,628,834 | A | * | 12/1986 | McKelvie | B01J 8/40 110/165 R |
| 6,263,750 | B1 | * | 7/2001 | Maurer | B06B 1/14 366/128 |
| 8,083,078 | B2 | * | 12/2011 | Omura | B65G 1/06 211/51 |

\* cited by examiner

*Primary Examiner* — Saul Rodriguez
*Assistant Examiner* — Ashley K Romano
(74) *Attorney, Agent, or Firm* — Steven M. Shape; Dennemeyer & Associates, LLC

(57) ABSTRACT

The invention relates to a vibratory floor made up of shaker modules protected against the entry of dust, and capable of emptying cohesive products. The inner volume (10) of each module is connected by means of a pipe (14) to an air or clean gas volume (19). Each module past the first row is provided with an anti-pressure device (46) made up of an anti-pressure plate (47) situated above the motor cover (44), supported by two flanges (48) and (49) resting on stationary parts (36) on either side of the module. The modules thus formed are protected against the entry of dust, and effectively emptying any cohesive product from silos, vessels, railroad cars or any other containers, without human or mechanized intervention.

19 Claims, 12 Drawing Sheets

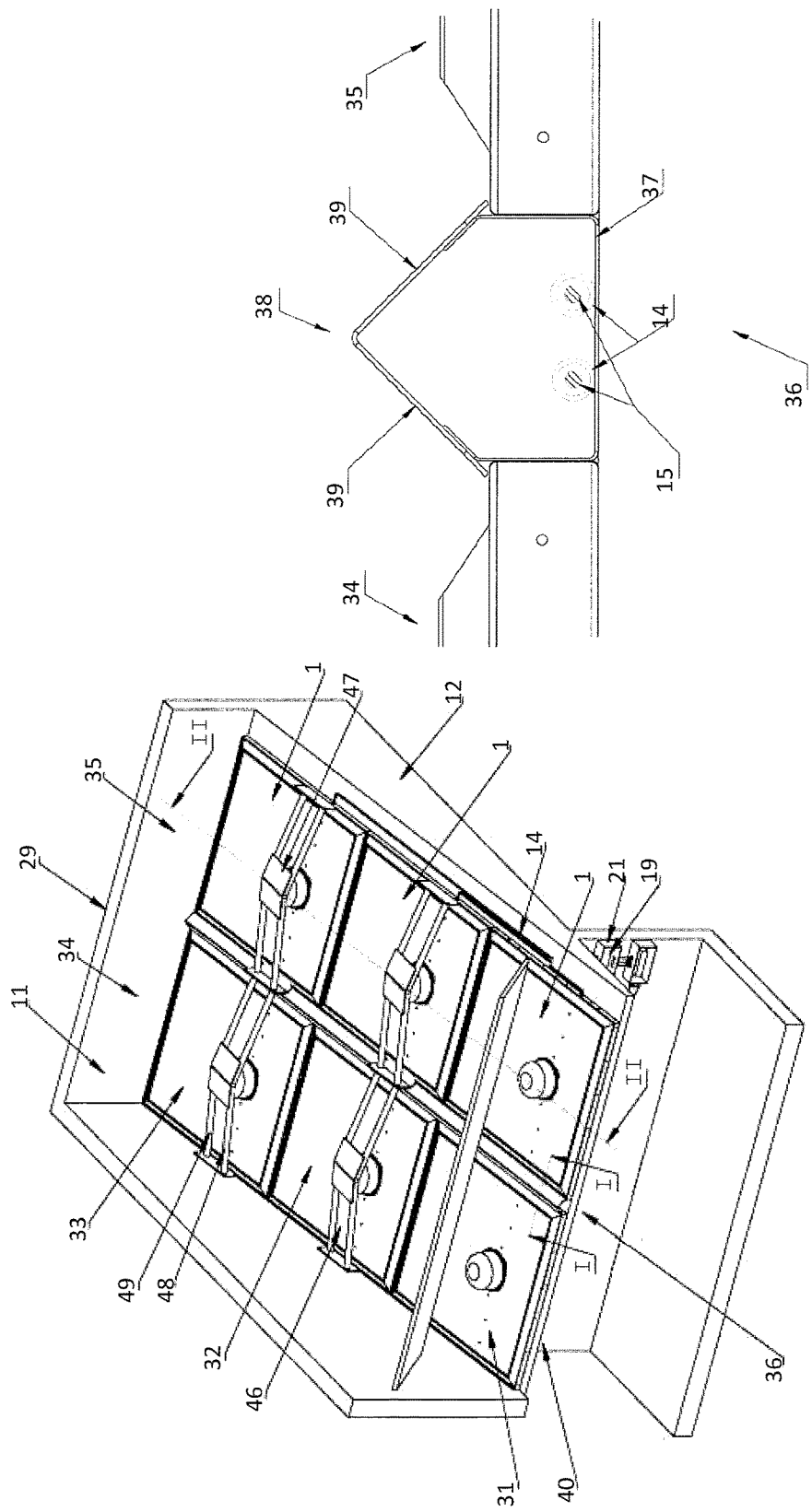

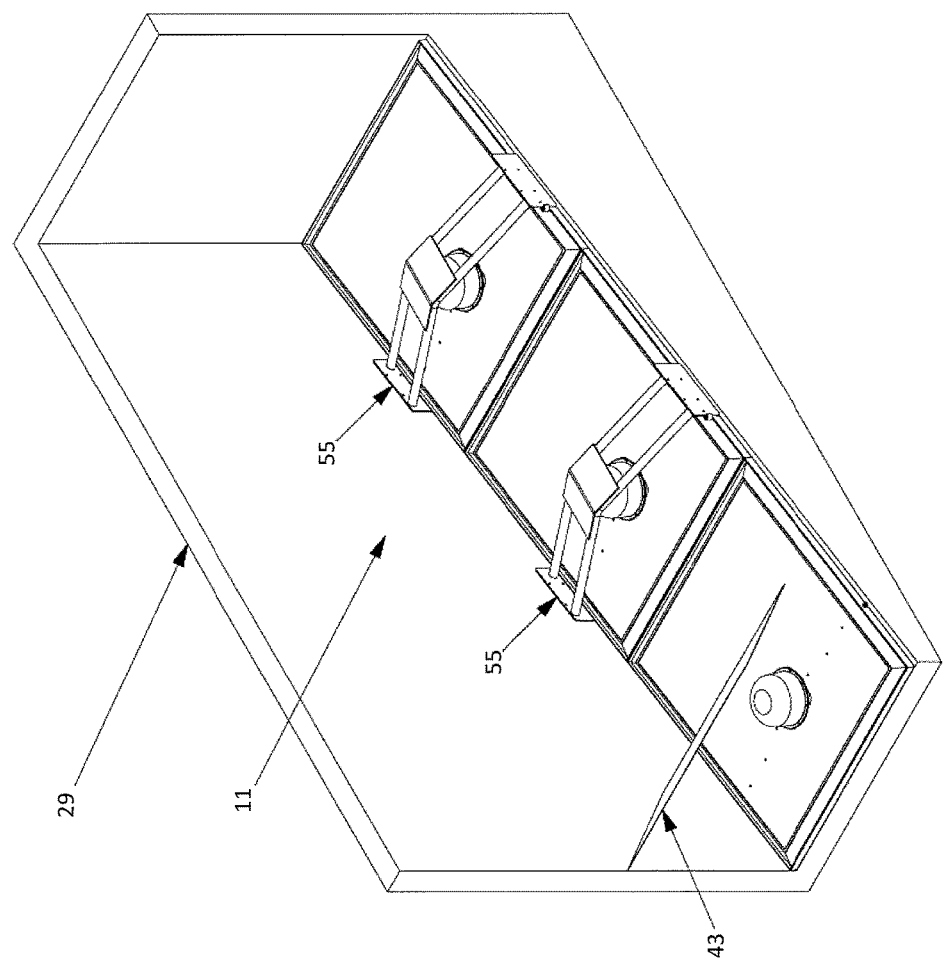

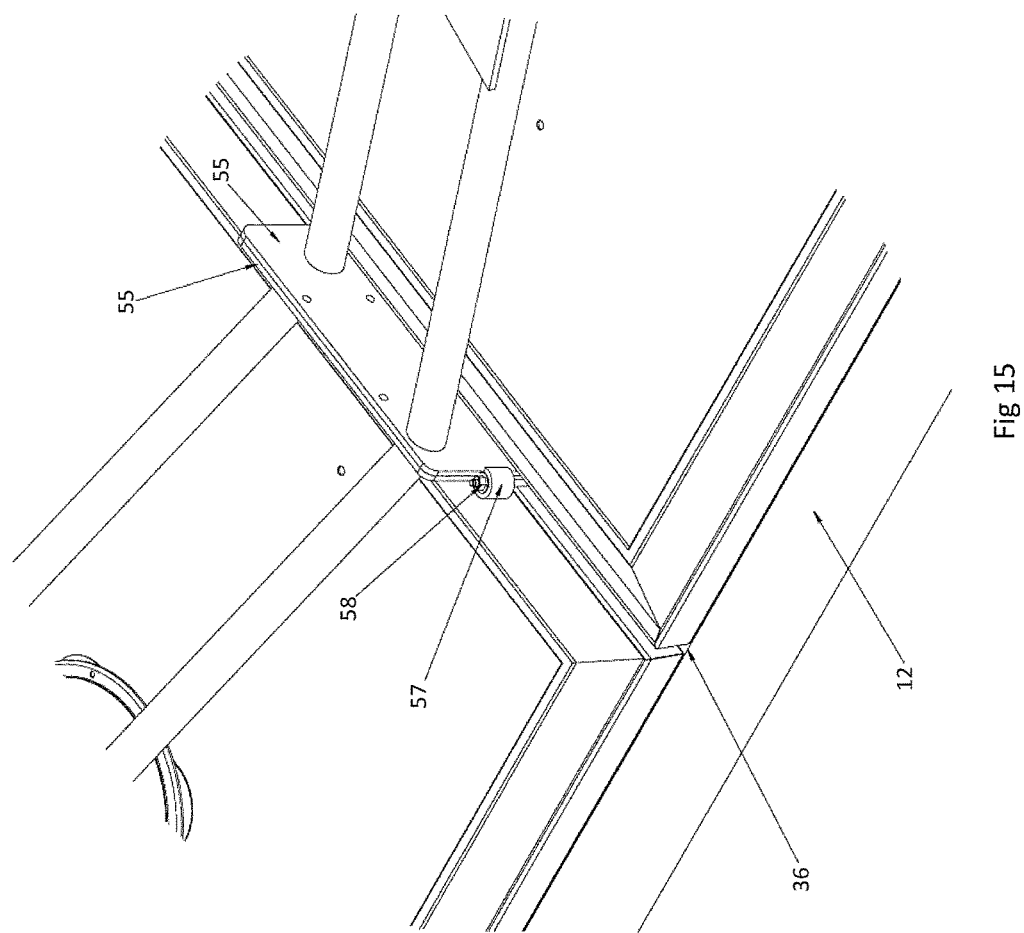

VIBRATORY FLOOR WITH CONTROLLED ATMOSPHERE, FOR COHESIVE PRODUCTS

The present invention relates to a vibratory floor designed to empty all grainy and powdery products, including cohesive products, from all types of containers, silos, vessels, receptacles, trucks and hoppers. It also ensures that dust does not penetrate inside the modules.

A vibratory floor is made up of one or more shaker modules, arranged on the slightly inclined bottom of a grainy or powdery material container. The function of the vibratory floor is to empty the residual piles, i.e., material that does not flow by gravity.

A shaker module is made up of a steel frame including crosspieces between which a filler material is arranged. Compression springs fixed on the crosspieces bear a metal sheet subject to at least one motor-driven vibrator and a peripheral sealing membrane. When the container is filled with material, the springs bearing the metal sheet are compressed, and the metal sheet bears on the filler material. During emptying, the springs are gradually depressed until final cleaning, and the metal sheet is raised and bears on the depressed springs. This process creates a vacuum inside the module, this vacuum being offset by a volume of air or gas gradually penetrating between the metal sheet, the filler material and the bottom of the frame.

The air thus absorbed at the bottom of the silo is filled with dust. The dust gradually fills the space between the metal sheet, filler material and bottom of the frame, until it prevents compression of the springs and thus blocks the operation of the shaker modules. The vibratory floor then becomes completely ineffective. The accumulation of dust between the metal sheet and the filler material can cause the sealing membrane to break, which makes the shaker modules unusable.

Furthermore, some very cohesive products, such as soybean meals, highly hydrophilic materials such as potassium, may harden in their containers. The pressure exerted by a cohesive mass, in particular near the cover of the motor-driven vibrator, generally prevents the vibrating floors that are currently commercially available from emptying these types of products.

The present invention relates to a vibratory floor that offsets the drawbacks of the prior vibratory floors, in particular by ensuring that the shaker modules only fill with clean air during the loading and unloading cycles while connecting the volume comprised inside the shaker module with a source of clean air or another gas, for example nitrogen.

It also aims to allow the emptying of all types of grainy and powdery products, including highly cohesive products.

To that end, the shaker module in question includes a pipe placed near the module, and an outer pipe arranged in a cable raceway, these pipes allowing the conveyance of the electrical power cable to the motor-driven vibrator. The junction between the two pipes is done inside the shaker module using a connecting piece including at least one hole. Furthermore, the outer pipe and the electric cable emerge outside the container, either through the floor of the container, or through a wall of the container, and penetrate a sealed box, or in the space outside the container.

Advantageously, the sealed box is equipped with an air filter, or alternatively with a pipe opening to the outside atmosphere. The inner volume of the shaker module is thus placed in communication with a volume of clean air, through the hole of the connecting piece between pipes, then through the outer pipe and the sealed box, or the space outside the container.

According to another feature of the invention, an outer pipe in which an electric cable does not travel connects the inner volume of the module with a box connected to a clean air volume, or with the space outside the container.

According to one particular feature of the invention, the box is connected to a partial or complete supply volume of another gas.

According to still another feature of the invention, the box is connected to a volume of air or a supply source of another gas, the air or the gas being introduced into the box at a pressure higher than the pressure inside the modules.

In the case of a vibratory floor made up of a plurality of modules, the modules are arranged in one or more rows along a slope, forming one or more bays of modules perpendicular to the slope. Spaces of variable width can be arranged between the bays of modules, in which, for example, the cable raceways for the electric power cables of the motor-driven vibrators can be installed.

In one particular embodiment, the modules are arranged in one or more circles around a central opening. In this case, spaces can be arranged along radial lines between the modules.

The modules constitute vibrating surfaces, while the spaces between modules constitute stationary, non-vibrating parts.

When a vibratory floor is designed to empty non-cohesive fluid products, the shape of the residual pile after gravitational emptying is triangular, and the vibratory floor can initiate cleaning of the residual slope in all scenarios.

When the product to be emptied is cohesive, in the case of soybean meals, wood particles, potassium, or any other cohesive products, the vibratory floor alone cannot initiate cleaning of the residual pile.

In the configurations with a single module, a single row or a single circle, one or more deflectors positioned near the discharge opening(s) make it possible to limit the pressure exerted by the content on the cover of the motor-driven vibrator, positioned in the lower part of the module(s). The cleaning of the residual pile can thus be done.

A problem arises in configurations with several rows or several circles of modules, when it becomes time to clean the second module or the second row or the second circle of modules. A cohesive product can indeed form a cliff, and the weight applied on the cover of the motor-driven vibrator may be too great to make it possible to continue cleaning the residual pile. The emptying process is stopped, and is then necessary to use alternative means, using handling vehicles or manually, which presents high risks for the operating personnel.

According to another feature of the invention, two flanges resting on stationary parts of the vibratory floor support an anti-pressure plate.

Advantageously, the anti-pressure plate is situated above the cover of the motor-driven vibrator, lightening it of the load of product that would otherwise bear directly on the cover.

According to still another feature of the invention, the flanges supporting the anti-pressure plate can be provided with triangular shapes, vertically and horizontally, in order to break the blocks of cohesive material that may slow the stream of product on the vibrating metal sheet. The profile of the flanges may also assume any shape, formed by two inclined straight half-lines, a chain profile in a vertical plane, or any other profile.

Other features of a vibratory floor, established according to the invention, will also appear in the following description of example embodiments, provided for information and non-limitingly, in reference to the appended drawings, in which:

FIG. 6 shows a perspective view of another vibratory floor

FIG. 7 is a sectional view of the interval between modules along line I-I of FIG. 6

Figure 8:
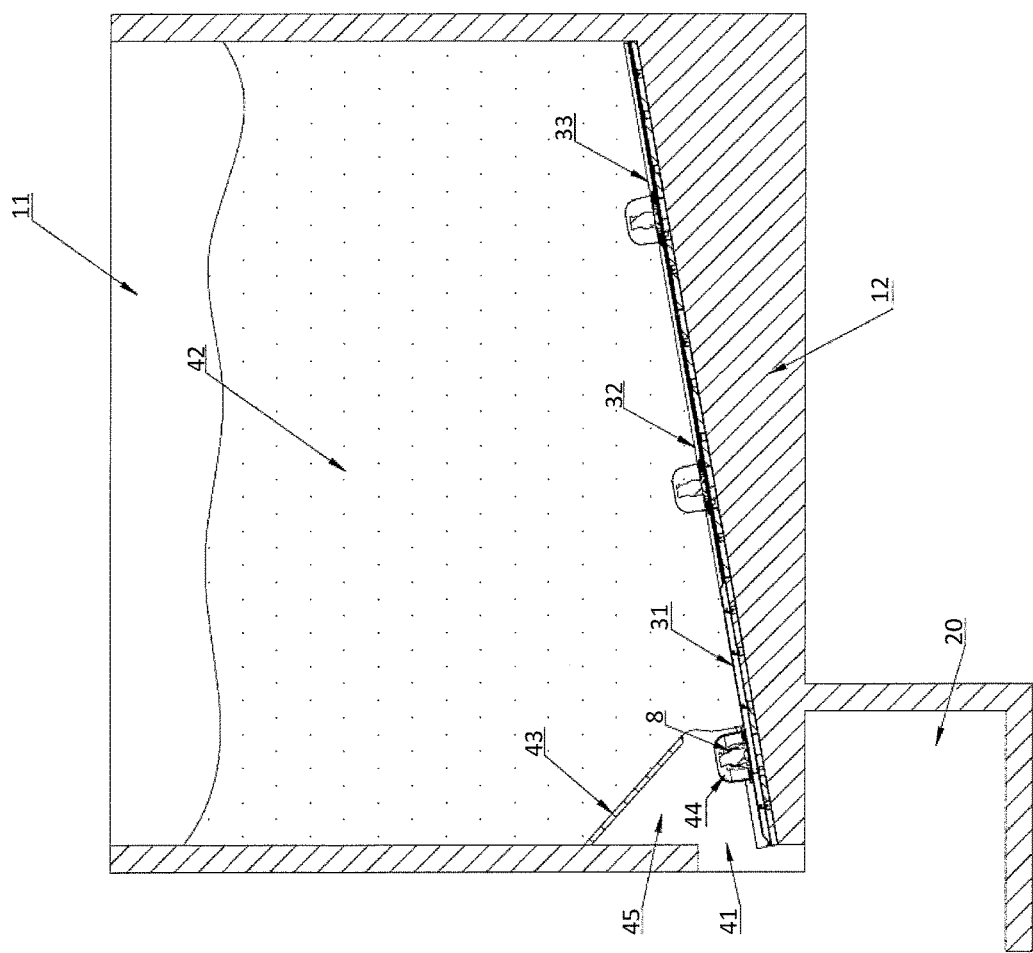
Figure 9:
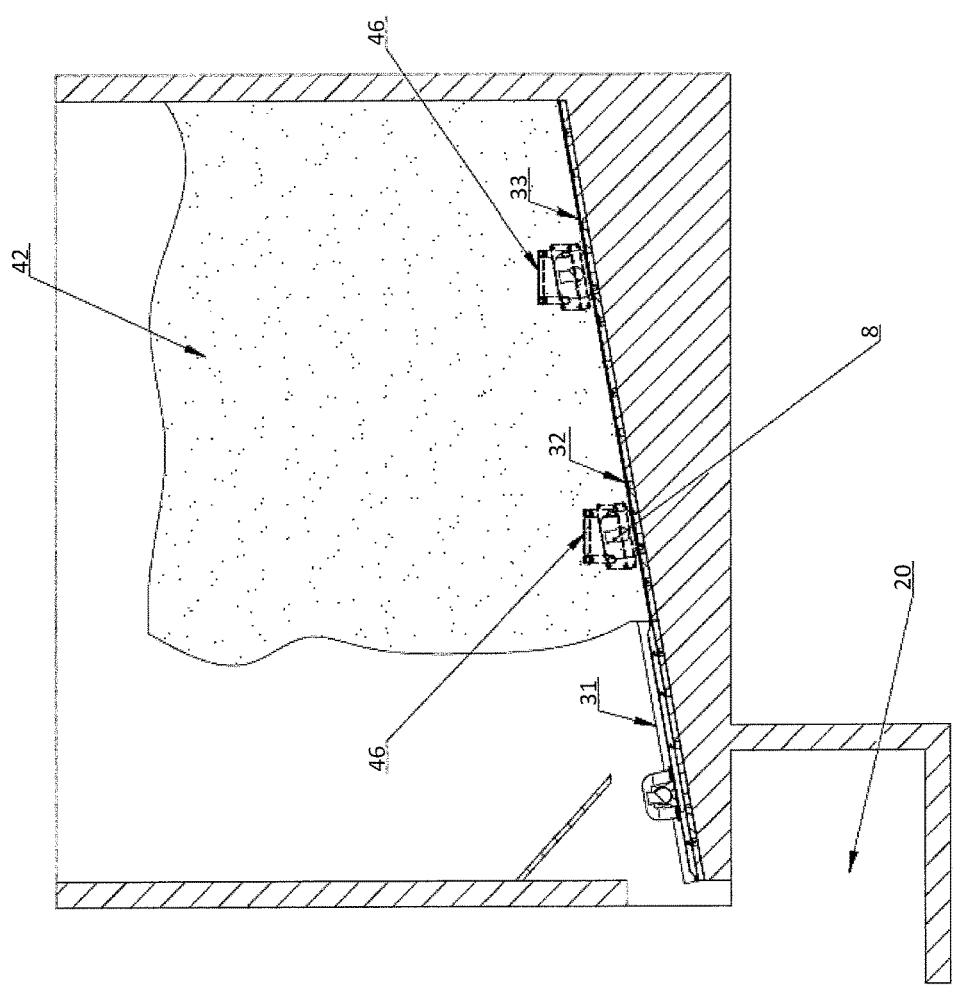
Figure 10:
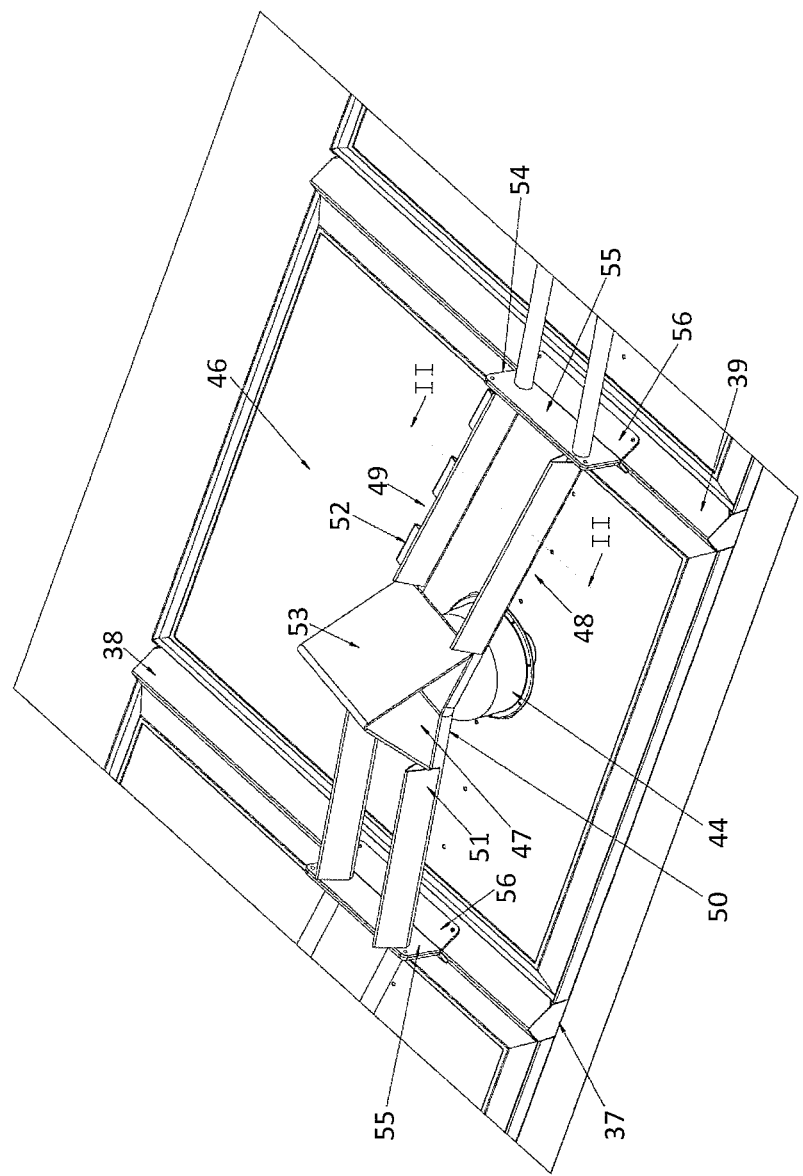
Figure 11:
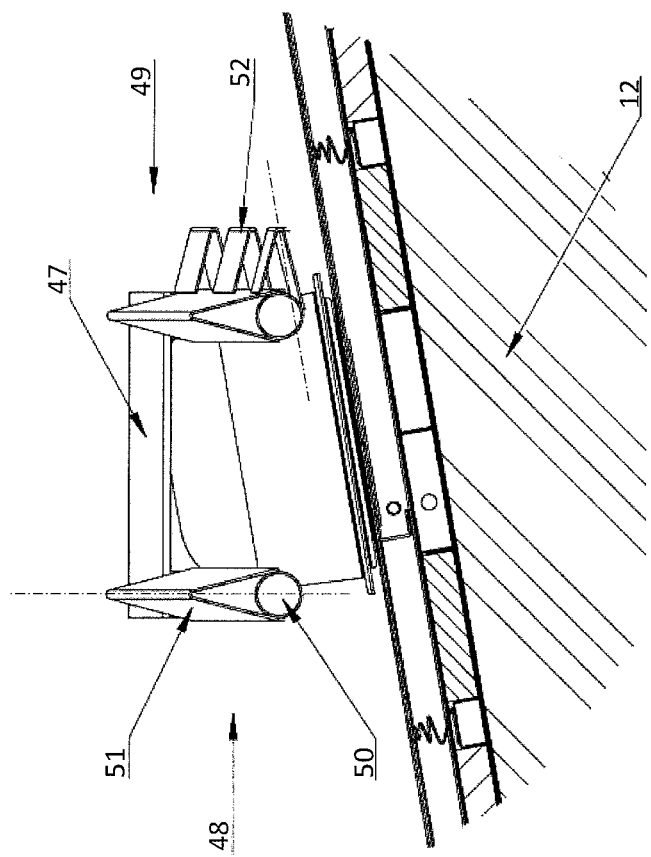

FIG. 8 is a longitudinal sectional view along line II-II of FIG. 6 of a vibratory floor loaded with a cohesive product FIG. 9 is a longitudinal section along line II-II of FIG. 6 of a vibratory floor under the load of a cohesive product after cleaning the lower modules FIG. 10 is a perspective view of the anti-pressure device FIG. 11 is a sectional view of the downstream and upstream flanges of the anti-pressure device along line of FIG. 9.

Figure 12:
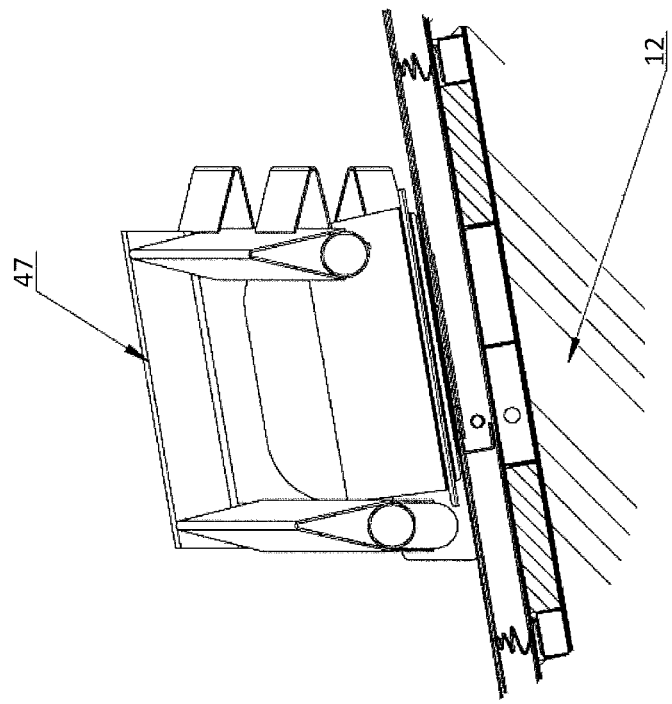

FIG. 12 is another sectional view of the downstream and upstream flanges along line III-III of FIG. 9

Figure 13:
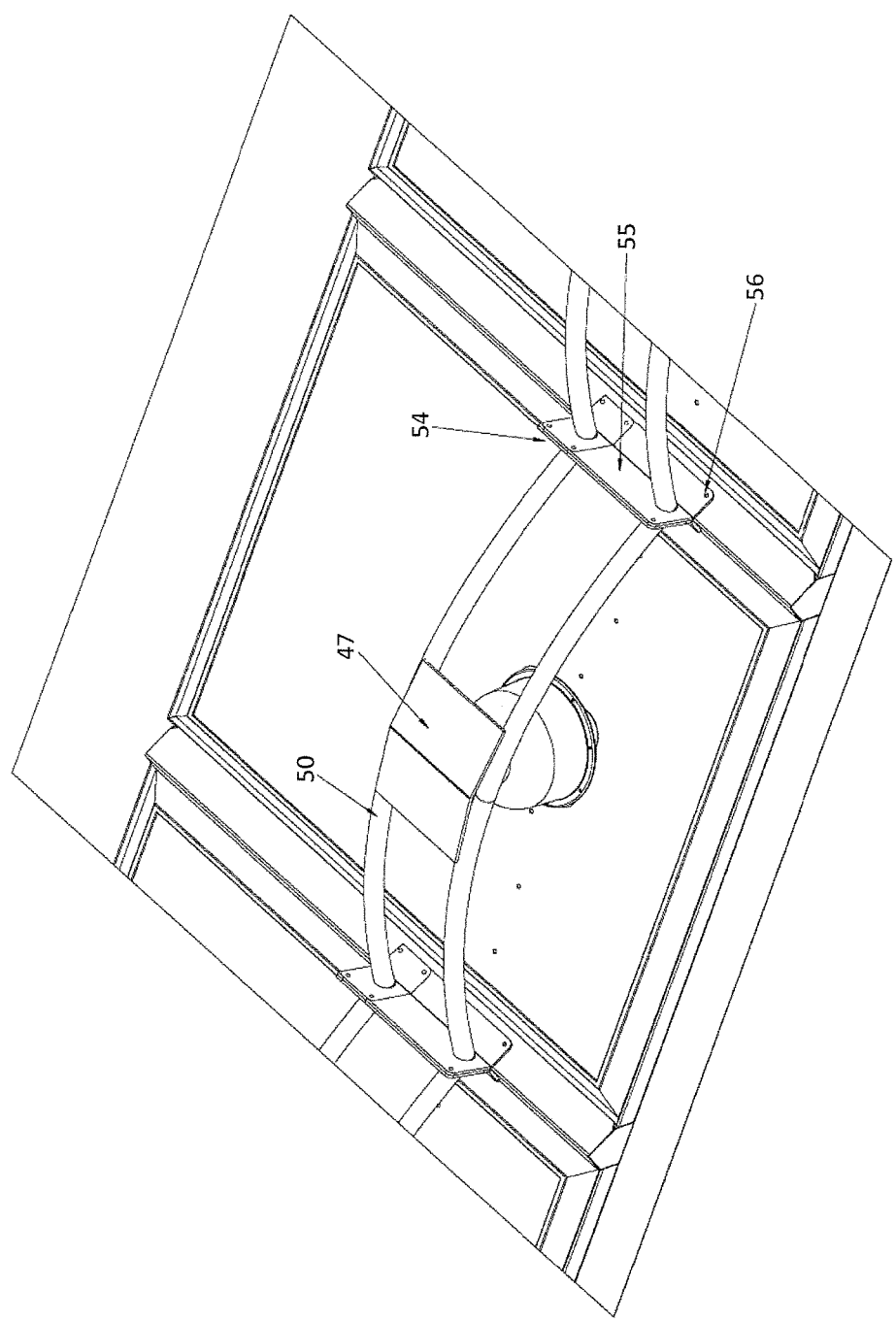

FIG. 13 shows a specific flange profile

FIG. 14 shows a perspective view of a silo with a single bay of modules

FIG. 15 illustrates a specific support embodiment for the anti-pressure device.

Figure 1:
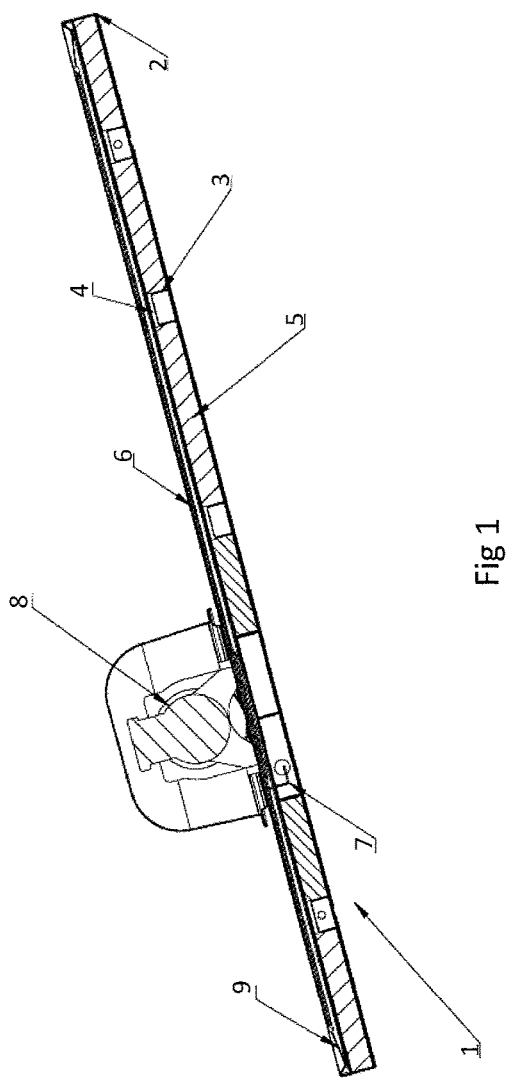
FIG. 1 shows a longitudinal sectional view of a shaker module under a load
Figure 2:
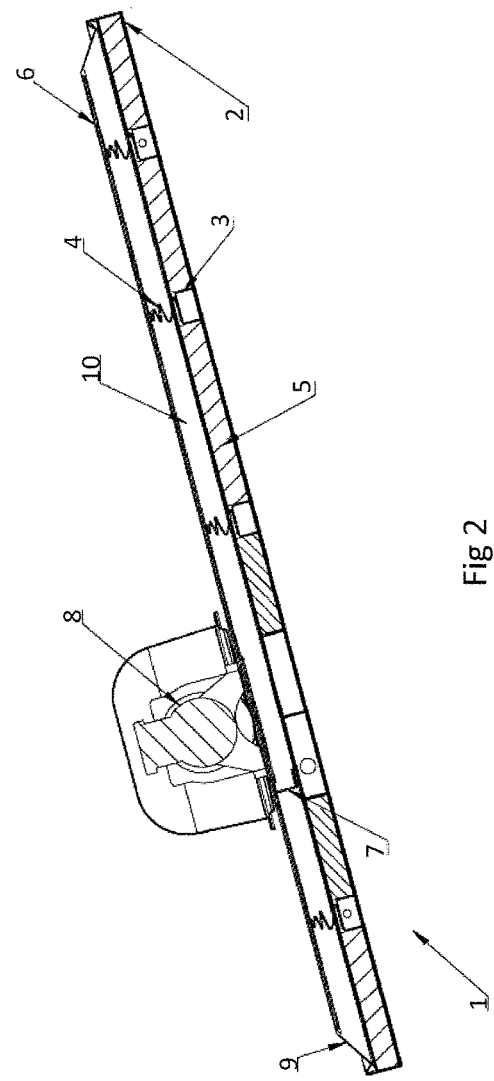
FIG. 2 shows the same shaker module, unloaded

In reference to FIG. 1, we will consider a shaker module 1 made up of a frame 2, including transverse flanges 3 on which springs 4 are fastened, and filled with a filler material 5 between the flanges 3. A metal sheet 6 subjected to a stiffener 7 and a motor-driven vibrator 8 rests on the frame 2 by means of springs 4. A peripheral membrane 9 of the metal sheet 6 provides the connection between the metal sheet 6 and the frame 2. FIG. 1 shows this module in the loaded position. FIG. 2 shows the same module unloaded, and the volume of air 10 having penetrated inside the module during the unloading operation.

Figure 3:
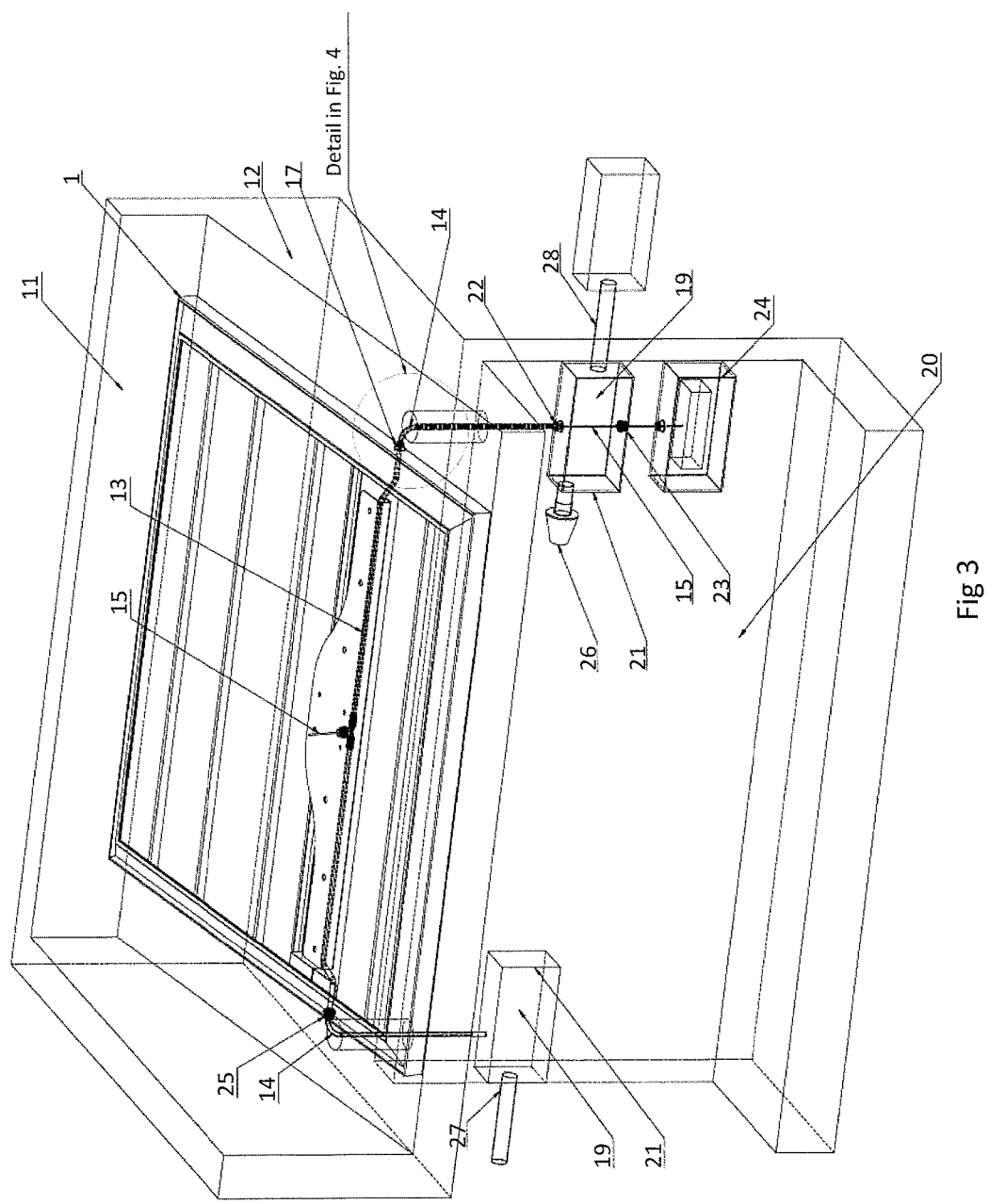
FIG. 3 is an exploded perspective view of a shaker module
Figure 4:
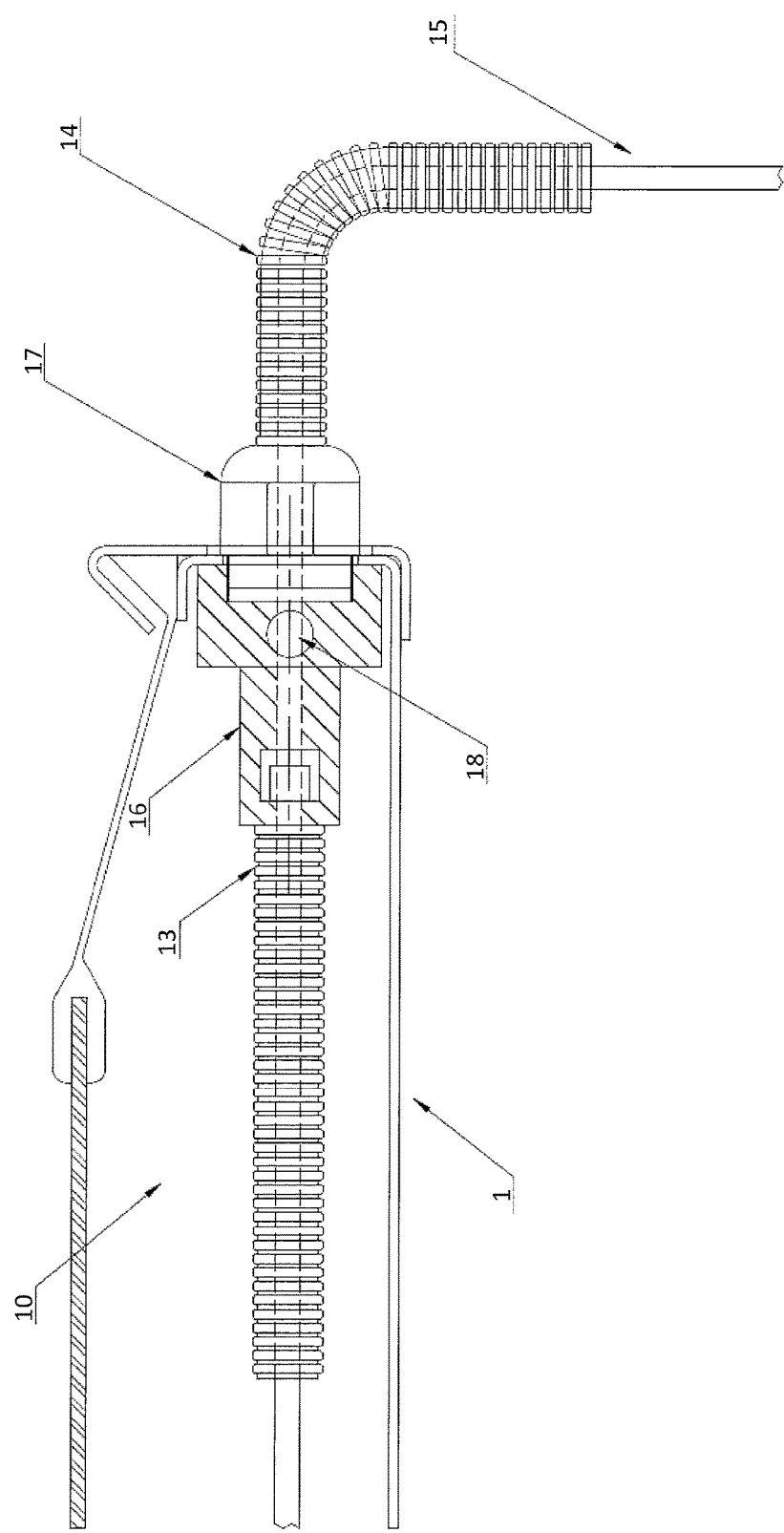
FIG. 4 is a detailed view of FIG. 3

FIG. 3 shows a module 1 installed in a container 11, for example a silo, the bottom of which is made up of a slope 12. An inner pipe 13 inside the module and an outer pipe 14 allow the passage of the cable 15 of the motor-driven vibrator 8, not shown. FIG. 4 more particularly shows that the inner pipe 13 is fastened to a connecting part 16. The outer pipe 14 is fastened to the same connecting part 16 by a cable gland 17. The connecting part 16 includes at least one free hole 18, placing the inner volume 10 of the module 1 in communication with the inner volume of the outer pipe 14, which in turn opens on a clean air volume 19, as indicated in FIG. 3. The pipe 14 is oversized relative to the cable 15 in order to ensure sufficient air passage inside the pipe 14. In reference to FIG. 3, in a space outside the container 11, for example in a tunnel 20 situated below the container 11, the clean air volume 19 is contained in a box 21, in which the pipe 14 and the cable 15 penetrate via a cable gland 22. The cable 15 leaves the box 21 by means of the cable gland 23, and enters a second electrical connection box 24.

In another embodiment also shown in FIG. 3, the outer pipe 14 is fastened on the side of the module 1 via a cable gland 25, and is connected in the same way to a clean air volume 19 contained in a box 21 without allowing passage of the cable 15.

The box 21 includes an air filter 26 of a known model that is cylindrical, rectangular or otherwise shaped, or alternatively a pipe 27 connecting the inside of the box 21 to another clean air volume 19, most often the atmosphere outside the container 11. Alternatively, the pipe 27 can be connected to a partial or full supply source of another gas. Several boxes 21 can also be connected to one another by a pipe 28.

Figure 5:
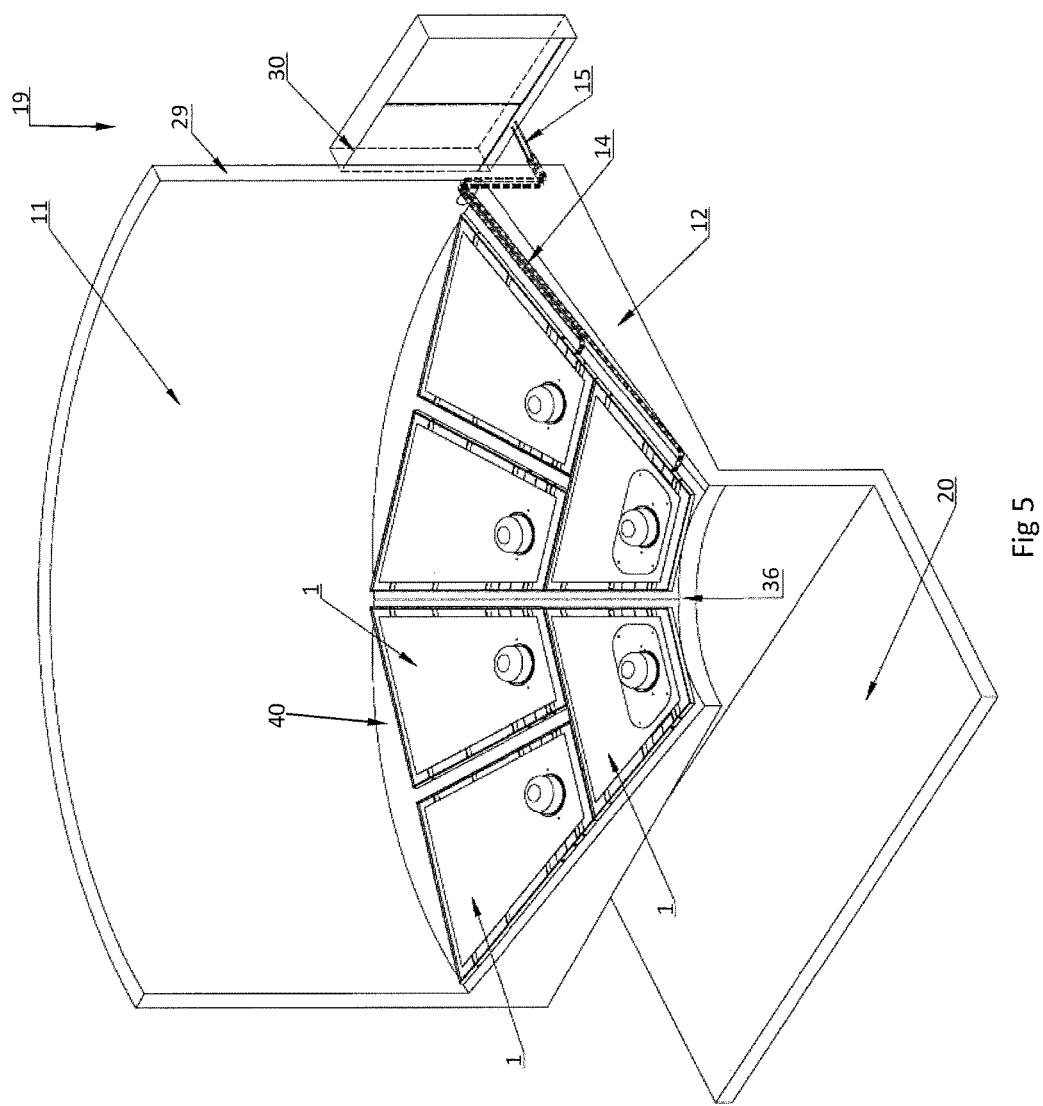
FIG. 5 shows a perspective view of a vibratory floor

FIG. 5 illustrates one particular embodiment in which the sheaths 14 and the cables 15 are passed through a wall 29. The wall 29 separates the inside of the container 11 from a clean air volume 19, in this case the atmosphere, the pipes 14 opening directly in the space 19. The cables 15 next directly penetrate an electrical cabinet 30.

The inside of the shaker modules 1 is thus placed in communication with a volume of clean air, filtered air or another gas.

FIG. 6 shows 3 shaker modules 31, 32 and 33 forming a bay 34 of three modules 1, adjacent to a bay 35, the bays 34 and 35 being arranged along the slope 12 of the silo 11, also made up of walls 29. Of course, a bay can be made up of any number of shaker modules without the scope of the present invention been altered. An interval 36 arranged between the bays 34 and 35 and more particularly shown in FIG. 7 can shelter a cable raceway 37 provided with a cover 38 made up of two inclined wings 39. The cable raceway 37 and its cover 38 make up stationary non-vibrating parts, inside which sheaths 14 and cables 15 can travel. The surface made up of shaker modules 1 and intervals 36 constitutes a vibrating floor 40.

FIG. 8 shows that at the bottom of the slope 12, there is an opening 41. The silo 11 is filled with a cohesive product 42 not flowing by gravity. A counter-slope 43 positioned above the cover 44 of the motor-driven vibrator 8 of the lower module 31 creates a non-compressed space 45 near the motor-driven vibrator 8, thus allowing the motor-driven vibrator 8 of the module 31 to destabilize the product 42.

FIG. 9 shows one possible loading scenario of the modules 32 and 33 after cleaning of the module 31, in the case where the content is a cohesive material 42. Without any particular precaution, the motor-driven vibrator 8 of the module 32, directly subjected to a very high pressure, alone cannot destabilize the cliff thus formed. FIG. 9 also shows the anti-pressure devices 46 of the modules 32 and 33.

FIG. 10 shows the anti-pressure device 46 in more detail, made up of an anti-pressure plate 47 maintained above the cover 44 of the motor-driven vibrator 8, not shown, by two flanges, a downstream flange 48 and an upstream flange 49. The minimum distance between the anti-pressure plate 47 and the top of the cover 44 is approximately 5 cm, value provided for information only and in no way limiting the scope of the present invention. The anti-pressure plate 47 prevents the product from bearing directly on the cover 44 of the motor-driven vibrator 8. The motor-driven vibrator 8 thus freed from the pressure of the product 42 of FIG. 9 is made able to oscillate and cause the destabilization of the product 42.

The downstream flange 48 is made up of a bar 50 with any section, preferably circular, on which a triangular profile 51 can be fastened over its entire length, or only one or several length sections, the axis of symmetry of the profile 51 being found on the vertical, the tip pointing upward. The profile 51 is used to break blocks of material that may fall on the anti-pressure device 46.

The upstream flange 49 is made up of a bar 50 and optionally the same vertical triangular profile 51, to which triangular profile sections 52 can be added positioned with axis parallel to the slope 12, tip toward the top of the slope, as shown in FIG. 11. The sections 52 are used to break the blocks of material that may descend along the slope, such that these blocks do not hinder the flow of the product.

The anti-pressure plate 47 is fastened in the upper part and at the apex of the two flanges 48 and 49.

The anti-pressure plate 47 can indifferently be positioned horizontally, as shown in FIG. 11, or parallel to the line of the slope 12, as indicated in FIG. 12.

As indicated in FIG. 10, a deflector 53 can be positioned above the anti-pressure plate 47 to reduce the pressure on the anti-pressure plate 47 and consequently on the anti-pressure device 46. A support plate 54 is secured to each of the ends of the bar 50, and includes a vertical part 55 and an oblique indented part 56. The oblique part 56 is fastened by screwing or bolting or by any other method on an inclined wing 39 of the cover 38 of the cable raceway 37. The vertical part 55 of the support plate 54 is fastened by bolting or by any other method to the same vertical part 55 of the adjacent anti-pressure device.

FIG. 13 shows flanges 48 and 49 whereof the bars 50 have a chain profile in a vertical plane, particularly strong with respect to vertical loads.

FIG. 14 shows a vibratory floor with a single bay. In this case, the support plate can be reduced to a vertical plate 55 fastened on a wall 29 of the silo 11.

In the case of a configuration with multiple bays, all of the adjacent vertical parts 55 of the support plates 54 are connected to one another by bolting or by any other fastening method. The vertical parts 55 of the bank support plates are fastened on walls 29 of the silo 11.

In another embodiment shown in FIG. 15, when a smaller interval 36 is arranged between the bays, the support plate 54 is reduced to one vertical plate 55, bearing on the slope 12 of the container 11, the adjacent plates 55 being connected to one another by bolting or by any other fastening method. In this case, the plates 55 include an eye plate 57 allowing the anchoring of the plates 55 in the slope 12 by using anchors 58.

Of course, the invention is not limited solely to the embodiments more specifically described and shown; on the contrary, it encompasses all alternatives. In particular, it is clear that any container of grainy and powdery material can be considered: silo, vessel, railroad car, container, hopper, etc., and that the rectangular or round shape of the storage silo is not exclusive, any other configuration being able to be considered, for example polygonal, hemispherical dome, with one or more tunnels, with one or more openings, etc.

Owing to the anti-pressure system according to the present invention, a vibratory floor is thus produced capable of removing all cohesive products in all possible configurations of vibratory floors, without manual or mechanized intervention, completely safely for the operating personnel. This new type of vibratory floor is further made up of modules that do not become dusty over time, which is a mark of reliability and durability for operators.

The invention claimed is:

1. A vibratory floor installed in a container (11) including a flexible-body-motion system to transport a particulate down a slope, the flexible-body-motion system comprising at least one shaker module (1), each shaker module including at least one motor-driven vibrator (8), a filler material (5) having a first planar surface and compression springs (4), the at least one motor-driven vibrator (8) is secured to a metal sheet (6) having a first planar surface, the first planar surface of the metal sheet bearing on the first planar surface of the filler material (5) when the vibratory floor bears a load, and on the compression springs (4) when the vibratory floor is not loaded, wherein an increase in an inner volume (10) defined between the first planar surface of the metal sheet and the first planar surface of the filler material of each shaker module during an emptying cycle is offset using an outer pipe (14) relative to a clean air volume (19) contribution outside the container.

2. The vibratory floor according to claim 1, wherein the outer pipe (14) serves as a passage sheath for an electrical power cable (15) of the at least one motor-driven vibrator.

3. The vibratory floor according to claim 1, further including a box (21) containing the clean air volume (19).

4. The vibratory floor according to claim 3, wherein the box (21) is equipped with an air filter (26).

5. The vibratory floor according to claim 1, further including at least two boxes (21) connected to one another by a further pipe (28).

6. The vibratory floor according to claim 5, wherein each of the at least two boxes (21) is supplied with clean air.

7. The vibratory floor according to claim 5, wherein each of the at least two boxes (21) is equipped with an air filter (26).

8. The vibratory floor according to claim 1, wherein air is completely or partially replaced by another gas.

9. The vibratory floor according to claim 1, wherein clean air volume (19) is the air outside the container.

10. The vibratory floor according to claim 1, wherein at least one module is provided with an anti-pressure device (46) made up of an anti-pressure plate (47) resting on two flanges (48) and (49), positioned such that the anti-pressure plate is positioned above a cover (44) of the motor-driven vibrator.

11. The vibratory floor according to claim 10, further including support plates (54) secured to the ends of the flanges, wherein the support plates (54) rest on stationary spaces (36) on either side of each of the at least one shaker module.

12. The vibratory floor according to claim 10, further including at least two support plates (54) situated on the same side of the flanges which only include vertical parts (55), anchored on a slope (12) of the container using eye plates (57) fastened on the vertical parts of the support plates, and anchors (58).

13. The vibratory floor according to claim 12, wherein the at least two support plates (54) include a vertical portion and an indented oblique portion (56), the indented oblique portion being fastened on a wing (39) of a cover (38) of a cable raceway (37), the vertical portion of one support plate (54) being bolted to the vertical portion of the support plate of the adjacent anti-pressure device.

14. The vibratory floor according to claim 10, further including at least two support plates (54) situated on the same side of the flanges include a vertical part fastened on a wall (29) of the container.

15. The vibratory floor according to claim 10, further including bars (50) making up the flanges have a circular section.

16. The vibratory floor according to claim 15, wherein the bars (50) making up the flanges include triangular profiles (51) having a tip oriented vertically with the tip pointing upward.

17. The vibratory floor according to claim 10, wherein triangular sections (52) can be fastened on the upstream flange (49), their axis parallel to a slope (12) of the container and the tip being oriented toward the top of the slope (12).

18. The vibratory floor according to claim 10, further including a deflector (53) which is secured to the anti-pressure plate.

19. The vibratory floor according to claim 10, further including bars making up the flanges have a chain profile in a vertical plane.

* * * * *